(12) United States Patent  
Qi et al.

(10) Patent No.: US 9,140,925 B2  
(45) Date of Patent: Sep. 22, 2015

(54) DISPLAY WITH REDUCED BORDER

(75) Inventors: Jun Qi, Cupertino, CA (US); Victor H. Yin, Cupertino, CA (US); Wenyong Zhu, Campbell, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 13/590,487

(22) Filed: Aug. 21, 2012

(65) Prior Publication Data

US 2014/0055719 A1 Feb. 27, 2014

(51) Int. Cl.  
*G02F 1/1333* (2006.01)  
*G02F 1/1335* (2006.01)  
*G02B 5/30* (2006.01)

(52) U.S. Cl.  
CPC ............ *G02F 1/133514* (2013.01); *G02B 5/30* (2013.01); *G02B 5/3025* (2013.01); *G02F 1/133512* (2013.01); *G02F 1/133528* (2013.01); *G02F 2001/133567* (2013.01)

(58) Field of Classification Search  
CPC ...................... G02F 1/133528; G02F 1/133512  
See application file for complete search history.

(56) References Cited

U.S. PATENT DOCUMENTS

| 6,992,826 | B2 | 1/2006 | Wang | |
|---|---|---|---|---|
| 7,919,153 | B2 | 4/2011 | Tomita et al. | |
| 2001/0019381 | A1* | 9/2001 | Ma et al. | 349/96 |
| 2004/0233524 | A1* | 11/2004 | Lippey et al. | 359/443 |
| 2008/0111948 | A1* | 5/2008 | Epstein et al. | 349/64 |
| 2011/0294244 | A1 | 12/2011 | Hattori et al. | |

FOREIGN PATENT DOCUMENTS

| EP | 1770415 | 4/2007 |
|---|---|---|
| WO | 2008010219 | 1/2008 |

* cited by examiner

*Primary Examiner* — Phu Vu  
(74) *Attorney, Agent, or Firm* — Treyz Law Group; G. Victor Treyz; Kendall P. Woodruff

(57) ABSTRACT

An electronic device may be provided with a display such as a liquid crystal display having upper and lower polarizer layers, a color filter layer, a liquid crystal layer, and a thin-film transistor layer. The display may have backlight structures that include a light guide plate, a reflector, and optical films. An opaque masking layer may be formed in a strip that runs along a peripheral edge of the lower polarizer in the display. The lower polarizer and the optical films may be separated by an air gap. The uppermost optical film may be a brightness enhancing film. The lower polarizer may be a matte polarizer layer, a polarizer film attached to an achromatic polarizing compensating film, or a matte polarizer that is attached to an achromatic polarizing compensating film coated with a matte coating.

21 Claims, 7 Drawing Sheets

DISPLAY WITH REDUCED BORDER

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display such as a liquid crystal display. The display may have upper and lower polarizer layers. The display may have layers located between the upper and lower polarizer layers such as a color filter layer, a liquid crystal layer, and a thin-film transistor layer.

The display may have backlight structures that include a light guide plate, a reflector, and optical films. The optical films may include brightness enhancing films and a diffuser layer.

An opaque masking layer may be formed in a strip that runs along a peripheral edge of the lower polarizer in the display. The lower polarizer and the optical films may be separated by an air gap. The uppermost optical film may be a brightness enhancing film.

The lower polarizer may be a matte polarizer layer, a polarizer film attached to an achromatic polarizing compensating film, or a matte polarizer that is attached to an achromatic polarizing compensating film coated with a matte coating. The matte materials in the lower polarizer may allow the lower polarizer to serve as a diffuser layer.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
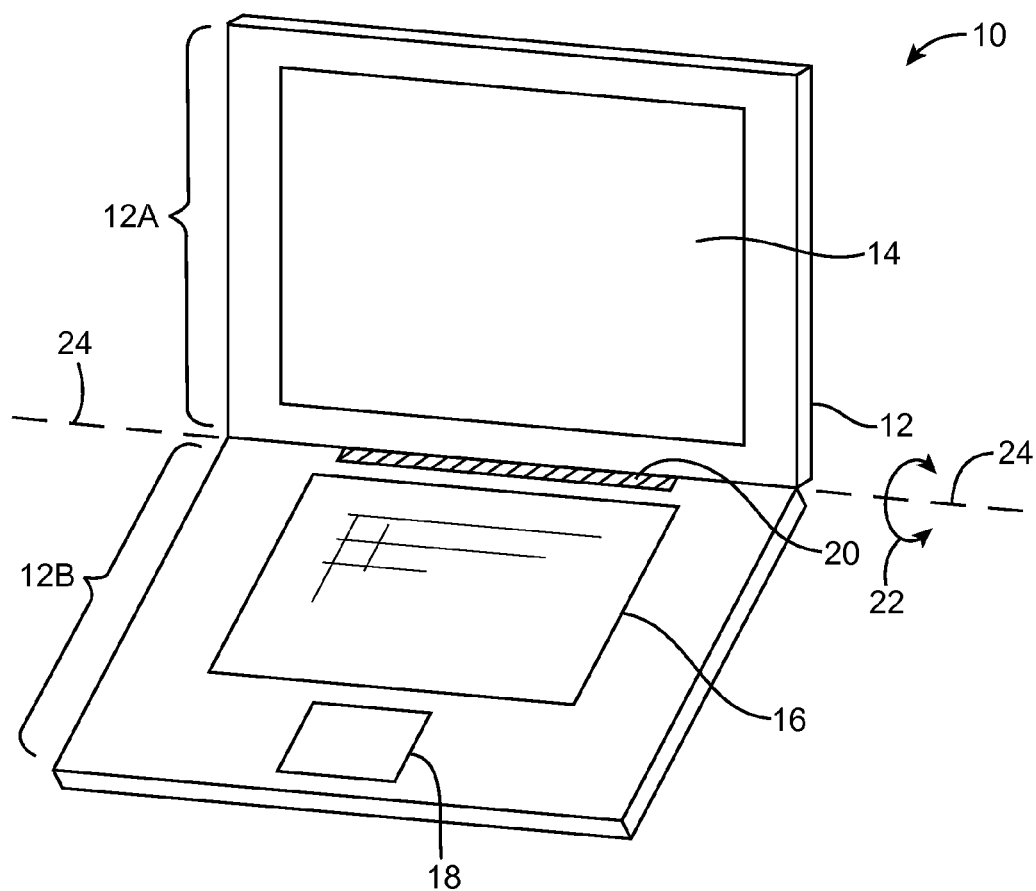
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
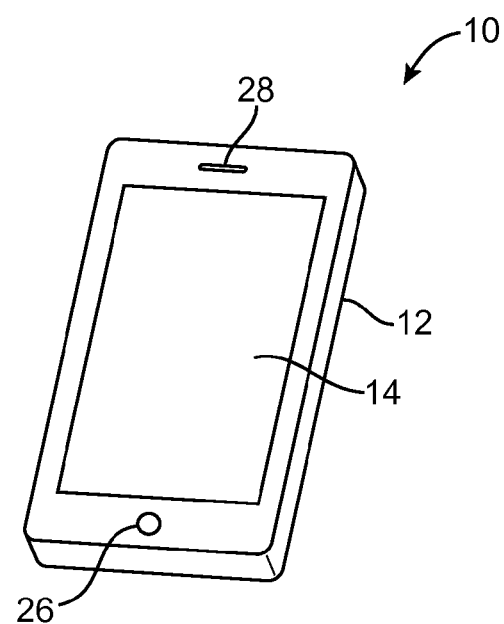
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
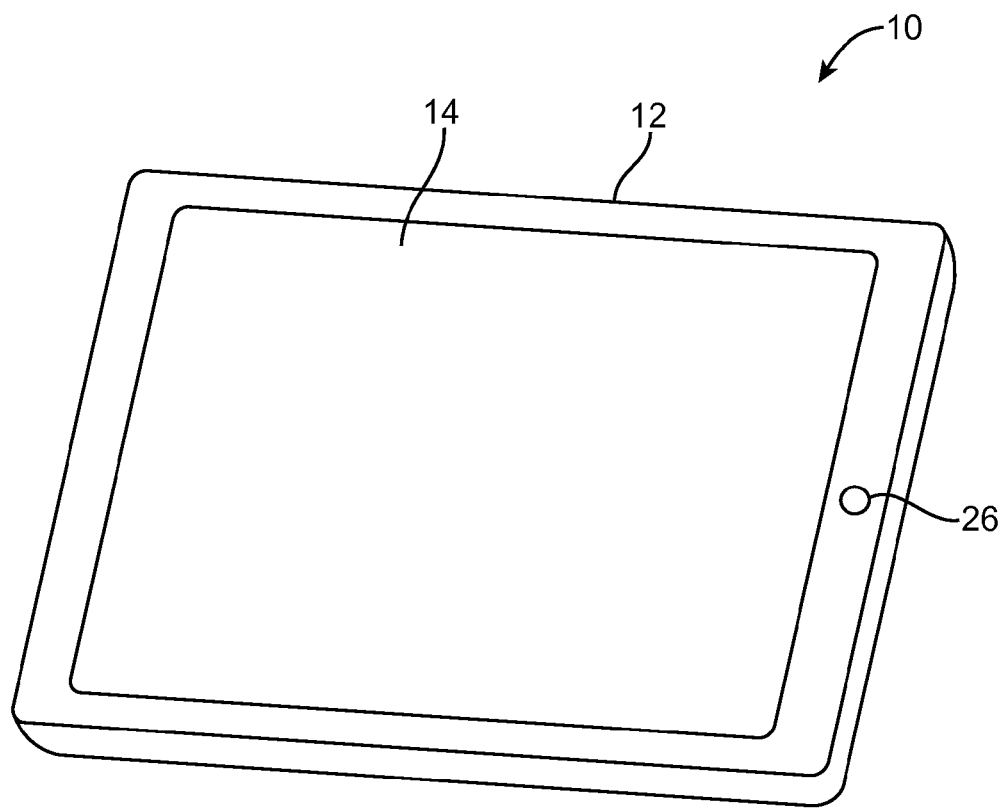
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
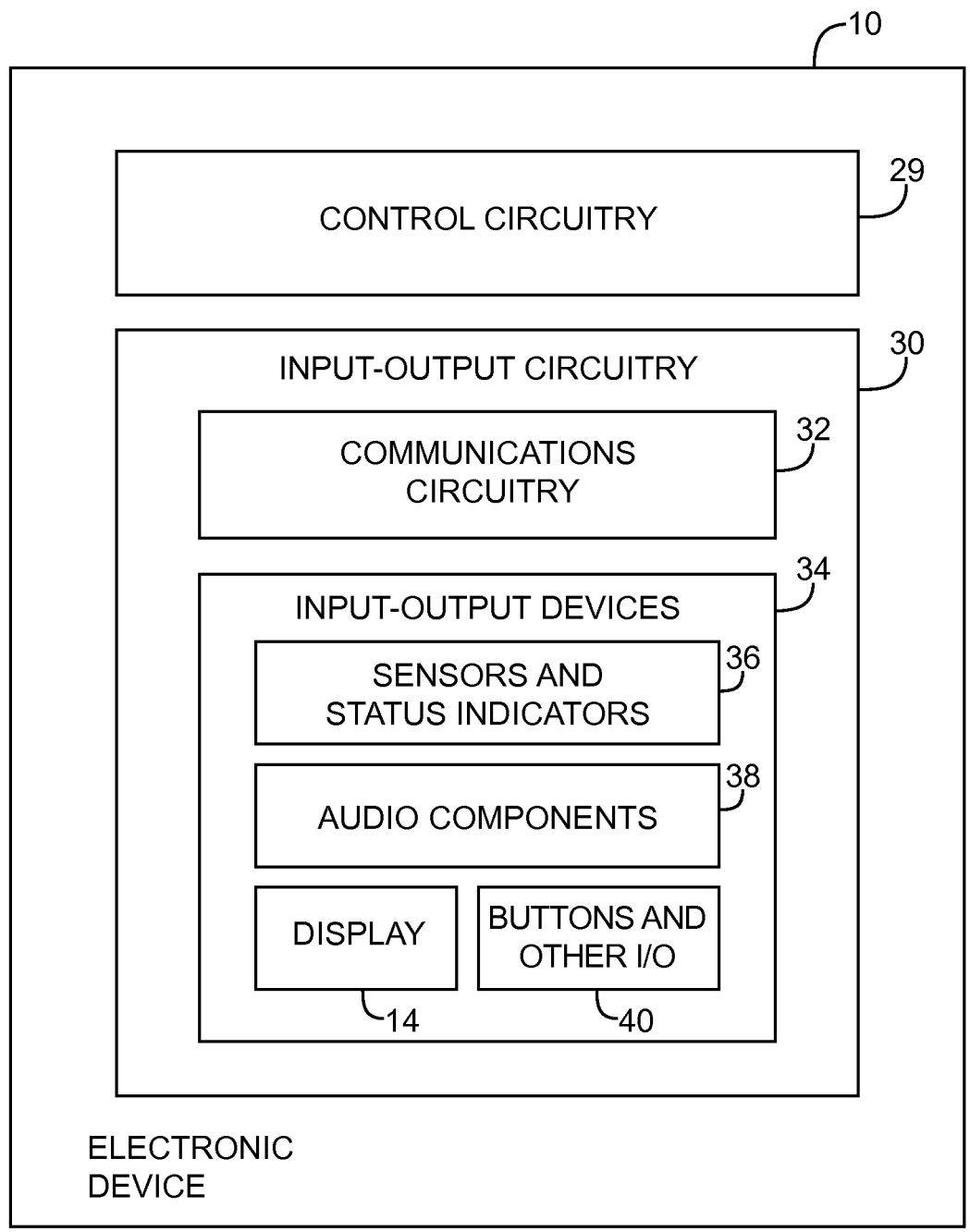
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
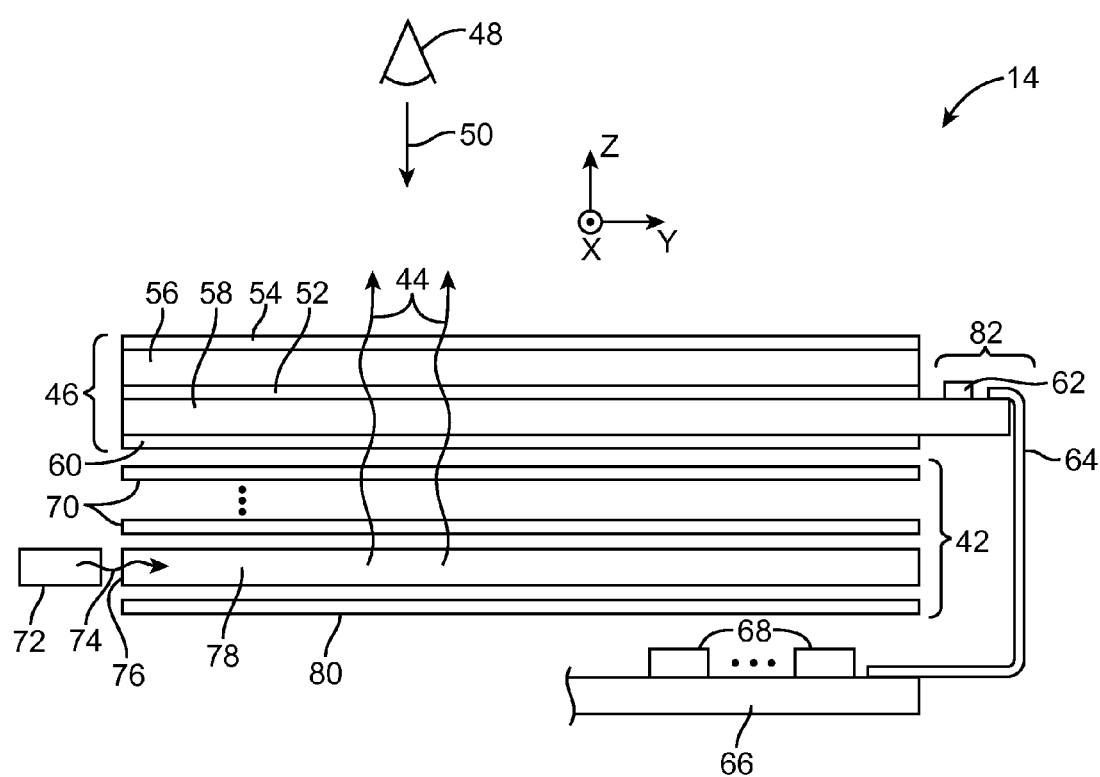
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
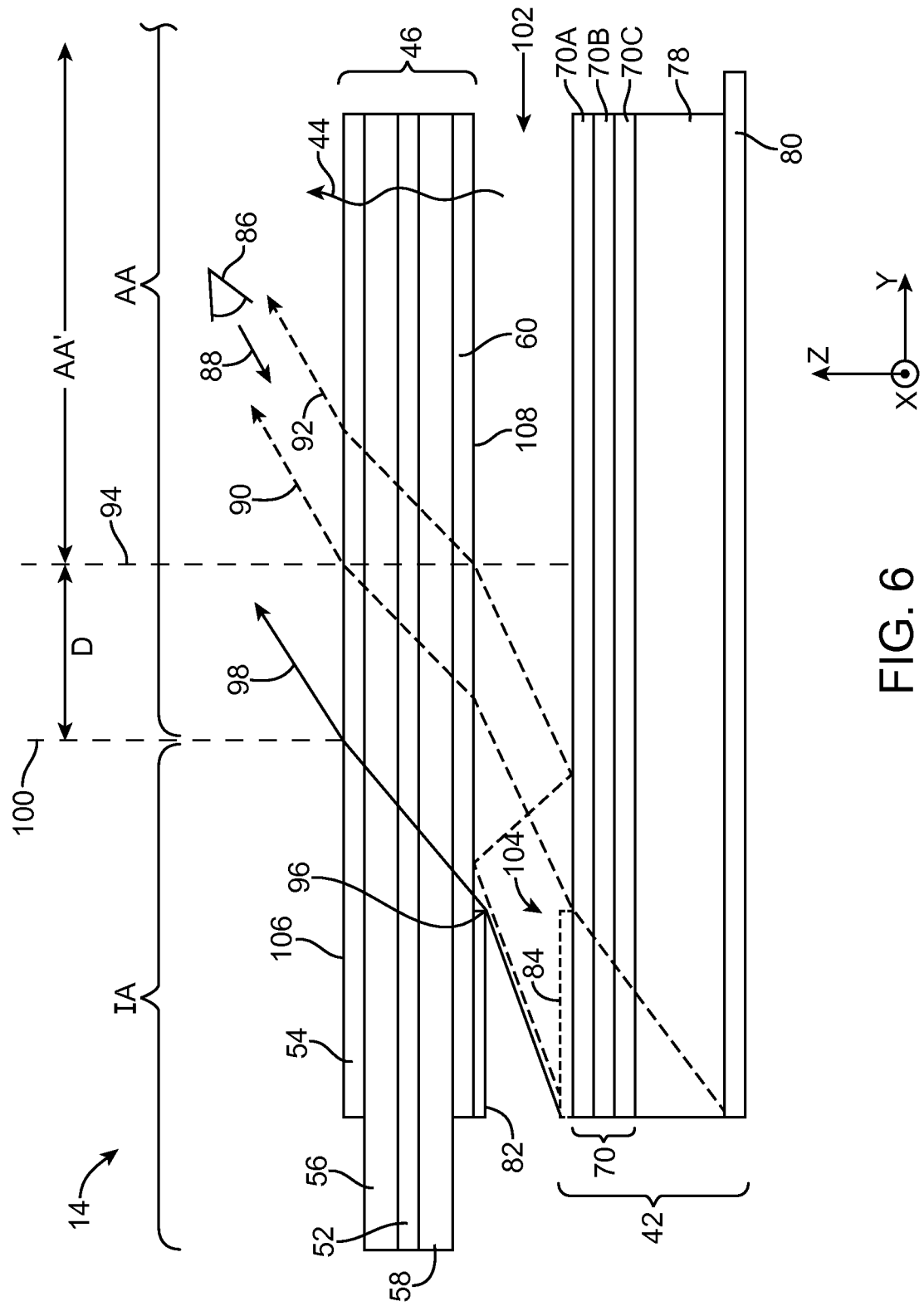
FIG. 6 is a cross-sectional side view of a display having an opaque masking layer in accordance with an embodiment of the present invention.

As shown in FIG. 6, display 14 may include opaque masking material such as opaque masking material 82 of FIG. 6. Opaque masking material 82 may be formed from a material such as black ink (e.g., a polymer that contains a filler such as carbon black) or other material that blocks light. Opaque masking material 82 may have the shape of a strip that runs along the periphery of display 14 (i.e., in a border region that located along the edge of the lower surface of polarizer layer 60 and that extends in dimension X in the example of FIG. 6). The border strip of opaque masking material may be used to block stray backlight 74.

Conventional displays have a black ink layer in a location such as location 84 (on the upper surface of the display layers that lie below air gap 102). The lower surface of conventional lower polarizers is shiny, leading to bright stray light reflections. As indicated by dashed lines 90 and 92, this can allow a viewer such as viewer 86 to view an unsightly reflected image of the black ink in location 84. Edge 104 of black ink 84 may mark the edge of the backlight portion of a conventional display. The point at which backlight light ray 90 (associated with conventional black ink edge 104) would exit the surface of the display coincides with dashed line 94. The location of dashed line 94 therefore represents the outermost possible boundary for a display surface such as surface 106 and may therefore represent the outermost possible boundary for conventional active display active area AA'.

By placing opaque masking layer 82 on the lowermost surface of polarizer layer 60, edge 96 of black masking layer 82 will be at a lateral location in dimension Y so that light ray 98 exits surface 106 of display 14 at location 100. This allows display active area AA to be increased (relative to conventional active area AA') by an increased width amount D, thereby reducing the size of display inactive border region IA.

Backlight unit 42 may include light guide plate 78 for laterally distributing backlight, reflector 80 for helping to direct backlight 44 upwards in dimension Z, and display layers 46. Display layers 46 may include layers such as a color filter layer, a thin-film-transistor layer, a layer of liquid crystal material, and layers of polarizing material. For example, display layers 46 may include upper polarizer layer 54, color filter layer 56, liquid crystal layer 52, thin-film transistor layer 58, and lower polarizer layer 60. Black masking layer 82 may be formed on the lower surface of polarizer layer 60 and may be separated from the uppermost surface of optical films 70 by air gap 102.

Optical films 70 may include layers such as brightness enhancing films, diffuser layers, and compensation films for enhancing off-axis viewing. These layers may be free of opaque masking layer materials (e.g., in locations such as location 84), because stray light masking functions can be performed by opaque masking layer 82 on polarizer layer 60.

To reduce light reflections from underside 108 of polarizer layer 60, polarizer layer 60 may include structures that reduce light reflections. These structures may be formed as an integral part of the polarizer (e.g., by using a matte polarizer to implement polarizer layer 60), by adding a matte surface to one or more other layers in polarizer layer 60, or by otherwise configuring polarizer layer 60 to reduce reflected light off of lower surface 108. The reflection-reducing structures may, if desired, be configured to provide sufficient light diffusing capabilities to make it possible to reduce or eliminate the diffusing layer structures in optical films 70. As an example, when sufficient light diffusing structures are incorporated into polarizer layer 60 (e.g., in the form of a matte layer, a matte coating, etc.), optical films 70 may include only lower diffuser layer 70C and brightness enhancing films 70A and 70B. No conventional upper diffuser layer need be provided on top of layer 70A.

Displays with configurations of the type shown in FIG. 6 are not subjected to misalignment between the opaque masking layer and other display structures such as the lower polarizer that can sometimes arise due to coefficient of thermal expansion mismatch when an opaque masking layer is formed in a location such as location 84 of FIG. 6. Registration challenges and issues with assembly tolerances may also be minimized.

In some arrangements for display 14, polarizer layer 60 may include a shiny layer such as a layer of achromatic polarizing compensating film. The positioning of opaque masking layer 82 on lower surface 108 of polarizer layer 60 in situations in which layer 60 is formed from a shiny film may, by virtue of the position of opaque masking layer 82, reduce the presence of undesired reflections and resulting undesired visible black ink images of the type that might be formed when locating the black ink in conventional location 84. In both arrangements in which polarizer 60 is provided with matte (non-shiny) structures and in which polarizer 60 has a shiny surface, display 14 will exhibit the benefits of reduced coefficient of thermal expansion mismatch and the elimination of registration and assembly tolerance problems.

Figure 7:
FIG. 7 is a cross-sectional side view of an illustrative matte polarizer layer that may be formed on the lower surface of a thin-film transistor layer in a display in accordance with an embodiment of the present invention.
Figure 8:
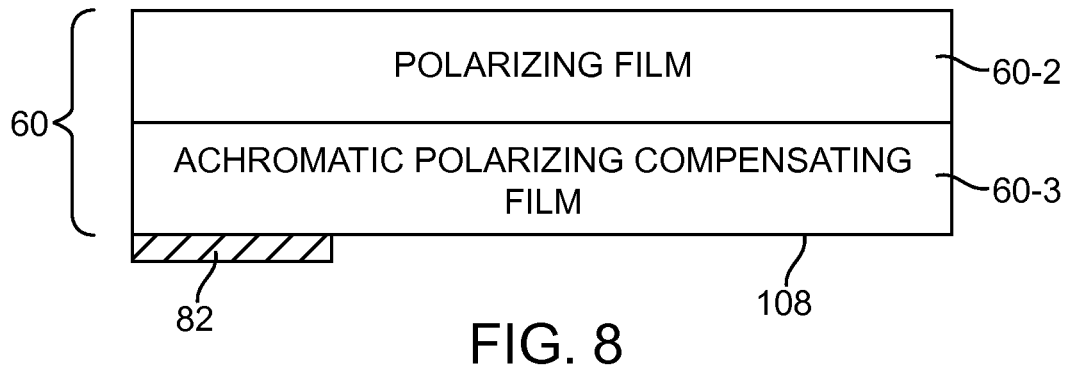
FIG. 8 is a cross-sectional side view of an illustrative polarizer and achromatic polarizing compensating film that may be formed on the lower surface of a thin-film transistor layer in accordance with an embodiment of the present invention.
Figure 9:
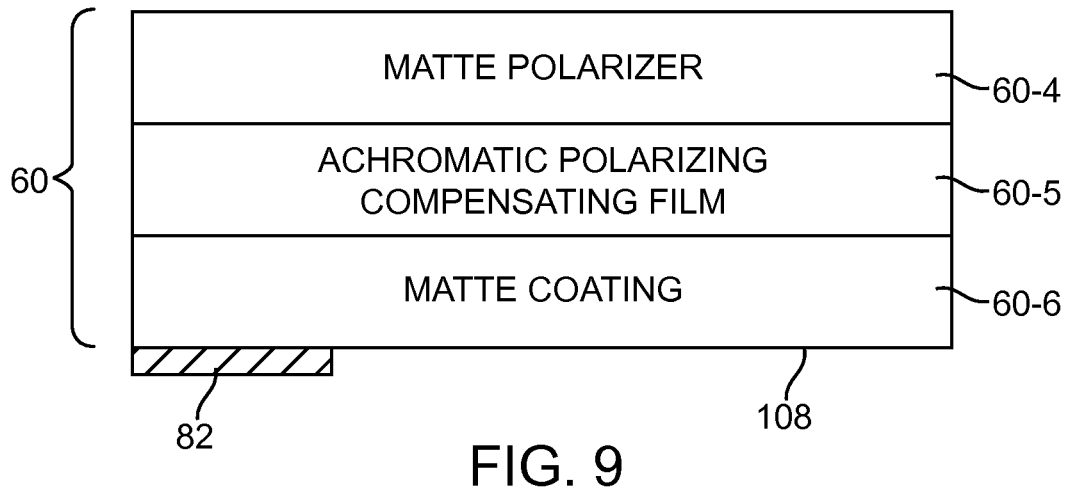
FIG. 9 is a cross-sectional side view of an illustrative polarizer and achromatic polarizing film coated with a matte coating in accordance with an embodiment of the present invention.

Illustrative configurations that may be used for polarizer layer 60 are shown in FIGS. 7, 8, and 9. In the illustrative configuration of FIG. 7, polarizer layer 60 has been formed from matte polarizer layer 60-1. Because matte polarizer 108 is formed from a matte material, lower surface 108 of matte polarizer layer 60-1 will reflect less light than shiny (non-matte) polarizer layers and will reflect less light than layers that are generally shiny such as achromatic polarizing compensating film. Opaque masking material 82 may be formed on lower surface 108 of matte polarizer 60-1.

FIG. 8 shows an illustrative configuration in which polarizer layer 60 has been formed from multiple layers such as upper layer 60-2 and lower layer 60-3. Layer 60-2 may be a polarizer film (a polarizer layer) and layer 60-3 may be an achromatic polarizing compensating film. Film 60-3 may increase light usage efficiency (e.g., for off-angle viewing) while performing polarization functions. Opaque masking material 82 may be formed on lower surface 108 of achromatic polarizing compensating film 60-3.

FIG. 9 shows an illustrative configuration in which polarizer layer 60 has been formed from three layers. Layer 60-4 is a matte polarizer. Layer 60-5 is an achromatic polarizing compensating film. Layer 60-6 is a matte coating (e.g., a clear polymer coating or inorganic coating of about 2-3 microns in thickness or more that provides lower surface 108 of polarizer layer 60 with a matte finish).

Figure 10:
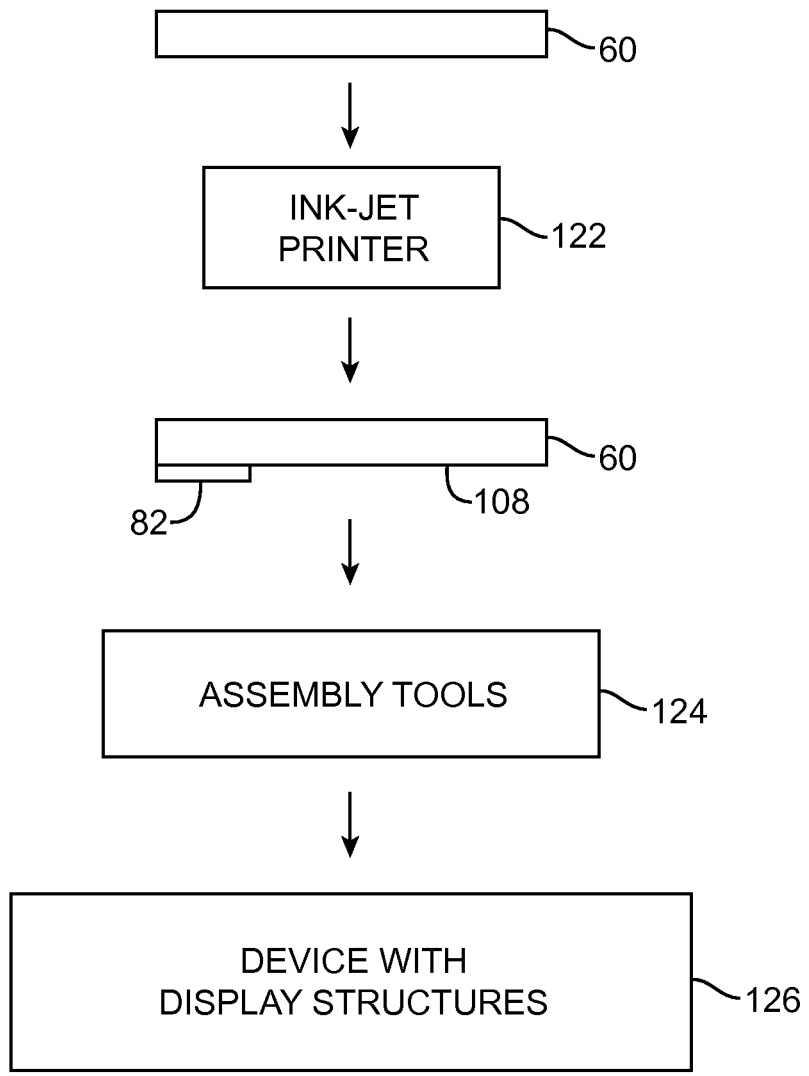
FIG. 10 is a diagram showing how ink-jet printing equipment and other tools may be used in creating display layers for an electronic device in accordance with an embodiment of the present invention.

FIG. 10 is a diagram showing how displays such as display 14 of FIG. 6 may be formed and assembled into a finished electronic device. Initially, polarizer layer 60 (e.g., a polarizer layer of the type shown in FIGS. 7, 8, and 9) may be provided to ink-jet printer 122 or other coating equipment. Ink-jet printer 122 may print opaque masking layer 82 in a strip on surface 108 that runs along the peripheral edge of polarizer layer 60. Assembly tools 124 may then be used to incorporate display layer 60 into display 14 and a finished version of device 10. Assembly tools 124 may include display layer lamination tools, equipment for incorporating display 14 into device 10, and other assembly equipment.

The foregoing is merely illustrative of the principles of this invention and various modifications can be made by those skilled in the art without departing from the scope and spirit of the invention.

What is claimed is:

1. A display, comprising:
a thin-film transistor layer;
a polarizer layer on the thin-film transistor layer, wherein the polarizer layer has a lower surface; and
a strip of opaque masking material that runs along a peripheral border region of the lower surface of the polarizer layer, wherein the polarizer layer separates the opaque masking material from the thin-film transistor layer.

2. The display defined in claim 1 further comprising:
optical films that are separated from the lower surface of the polarizer by an air gap.

3. The display defined in claim 2 wherein the optical films include a brightness enhancing film.

4. The display defined in claim 3 wherein the brightness enhancing film has an upper surface that is adjacent to the air gap.

5. The display defined in claim 2 wherein the optical films include a lower diffuser, a first brightness enhancing film, and a second brightness enhancing film and wherein the second brightness enhancing film has a surface that is adjacent to the air gap.

6. The display defined in claim 5 further comprising a light guide plate, wherein the optical films are interposed between the air gap and the light guide plate.

7. The display defined in claim 1 wherein the polarizer layer comprises a matte polarizer having opposing first and second surfaces and wherein the second surface forms the lower surface of the polarizer.

8. The display defined in claim 1 wherein the polarizer layer comprises an achromatic polarizing compensating film and wherein the lower surface forms a surface of the achromatic polarizing compensating film.

9. The display defined in claim 8 wherein the polarizer layer further comprises a polarizer film on the achromatic polarizing compensating film.

10. The display defined in claim 1 wherein the polarizer layer comprises a matte polarizer.

11. The display defined in claim 10 wherein the polarizer layer comprises a matte coating.

12. The display defined in claim 11 wherein the polarizer layer comprises an achromatic polarizing compensating film located between the matte coating and the matte polarizer.

13. The display defined in claim 1 wherein the polarizer layer comprises a matte coating layer and wherein the lower surface forms a surface of the matte coating layer.

14. A display, comprising:
a color filter layer;
a thin-film transistor layer;
a layer of liquid crystal material between the color filter layer and the thin-film transistor layer;
an optical film;
an air gap between the thin-film transistor layer and the optical film;
a strip of opaque masking material located between the air gap and the thin-film transistor layer; and
a lower polarizer located between the opaque masking material and the thin-film transistor layer.

15. The display defined in claim 14 further comprising an upper polarizer on the color filter layer, wherein the and a lower polarizer is interposed between the thin-film transistor layer and the air gap, and wherein the strip of opaque masking material is an ink-jet printed black ink layer on the lower polarizer.

16. The display defined in claim 15 wherein the optical film comprises a brightness enhancing film having a surface adjacent to the air gap and wherein the display further comprises a light guide plate, wherein the brightness enhancing film is located between the light guide plate and the air gap.

17. The display defined in claim 14 wherein the lower polarizer comprises a matte polarizer.

18. A display, comprising:
   display layers including at least one polarizer layer having a surface;
   an opaque masking layer on a peripheral border portion of the surface; and
   an optical film, wherein the polarizer layer and the optical film are separated by an air gap and wherein the opaque masking layer is interposed between the polarizer layer and the optical film.

19. The display defined in claim 18 in which the polarizer layer comprises a matte polarizer.

20. The display defined in claim 18 wherein the polarizer layer comprises an achromatic polarizing compensating film.

21. The display defined in claim 18 wherein the polarizer layer comprises an achromatic polarizing compensating film and a matte coating on the achromatic polarizing compensating film and wherein the surface is a surface of the matte coating.

\* \* \* \* \*